United States Patent
Kim et al.

(10) Patent No.: US 10,103,618 B2
(45) Date of Patent: Oct. 16, 2018

(54) POWER FACTOR CORRECTION CIRCUIT WITH CALCULATED DUTY COMPENSATION AND DRIVING METHOD THEREOF

(71) Applicant: FAIRCHILD KOREA SEMICONDUCTOR LTD., Bucheon (KR)

(72) Inventors: Jintae Kim, Seoul (KR); Hangseok Choi, Bedford, NH (US); SangCheol Moon, Daejeon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/392,964

(22) Filed: Dec. 28, 2016

(65) Prior Publication Data

US 2017/0194853 A1    Jul. 6, 2017

Related U.S. Application Data

(60) Provisional application No. 62/273,647, filed on Dec. 31, 2015.

(51) Int. Cl.
*H02M 1/42* (2007.01)
*H02M 7/06* (2006.01)

(52) U.S. Cl.
CPC ........... *H02M 1/42* (2013.01); *H02M 1/4225* (2013.01); *H02M 7/06* (2013.01); *Y02B 70/126* (2013.01)

(58) Field of Classification Search
CPC ..................................................... H02M 1/42
See application file for complete search history.

(56) References Cited

U.S. PATENT DOCUMENTS

| | | |
|---|---|---|
| 4,942,509 A | 7/1990 | Shires et al. |
| 5,886,586 A | 3/1999 | Lai et al. |
| 7,068,016 B2 | 6/2006 | Athari |
| 2004/0239296 A1* | 12/2004 | Turchi ............... G05F 1/70 323/222 |
| 2013/0163300 A1* | 6/2013 | Zhao ............... H02M 1/42 363/89 |

(Continued)

OTHER PUBLICATIONS

Jeffrey Hwang, et al "New Universal Control Methods for Power Factor Correction and DC to DC Converter Applications", 1997 IEEE, pp. 59-65.

*Primary Examiner* — Jue Zhang
*Assistant Examiner* — Trinh Q Dang
(74) *Attorney, Agent, or Firm* — AMPACC Law Group, PLLC

(57) ABSTRACT

Provided is a power factor correction circuit including an inductor having one end to which an input voltage is applied; a power switch connected between another end of the inductor and the ground, and configured to control an output of the power factor correction circuit; and a power factor correction controller configured to calculate a duty of the power switch on the basis of an output detection voltage corresponding to the output and an inductor current flowing through the inductor, calculate conduction-period information regarding a conduction period in which the inductor current flows in one switching cycle of the power switch, and compensate the calculated duty on the basis of the conduction-period information.

15 Claims, 11 Drawing Sheets

(56) References Cited

U.S. PATENT DOCUMENTS

| | | | |
|---|---|---|---|
| 2014/0340949 A1* | 11/2014 | Chen | H02M 1/4225 363/44 |
| 2015/0117074 A1* | 4/2015 | Miao | H02M 1/4225 363/44 |
| 2015/0146458 A1* | 5/2015 | Lim | H02M 3/158 363/44 |
| 2016/0094142 A1* | 3/2016 | Mahdavikhah | H02M 1/4225 363/44 |
| 2016/0344282 A1* | 11/2016 | Lin | H02M 1/4225 |

* cited by examiner

POWER FACTOR CORRECTION CIRCUIT WITH CALCULATED DUTY COMPENSATION AND DRIVING METHOD THEREOF

CROSS-REFERENCE TO RELATED APPLICATION

This application claims priority to and the benefit of U.S. Patent Application No. 62/273,647 filed in the USPTO on Dec. 31, 2015, the entire contents of which are incorporated herein by reference.

BACKGROUND

(a) Technical Field

The present disclosure relates to a power factor correction circuit and a driving method thereof.

(b) Description of the Related Art

In average current mode controlled power factor correction, a rectified line voltage and a rectified line current should be sensed to control a line current to have the same phase and shape as the line voltage. Operations are performed on sensed signals by a multiplier and a divider to generate a reference signal. An inductor current should be controlled by the reference signal. However, the line current is an average current of currents flowing through the inductor. Thus, in a discrete conduction mode (DCM), where an interval in which a current flowing through the inductor is 0 occurs, the line current may be distorted.

The distortion of the line current may also occur in a power factor correction circuit controlled according to a modulated carrier control method or a one-cycle control method. When the power factor correction circuit operates in the DCM due to a decrease in the load on the power factor correction circuit or an increase in a line voltage, the power factor correction circuit cannot be precisely controlled and thus the line current may be distorted to a large extent.

SUMMARY

A power factor correction circuit capable of decreasing distortion of a line current even in a discrete conduction mode (DCM) and a driving method thereof are provided.

According to one aspect of the present invention, a power factor correction circuit includes an inductor having one end to which an input voltage is applied; a power switch connected between another end of the inductor and the ground, and configured to control an output of the power factor correction circuit; and a power factor correction controller configured to calculate a duty of the power switch on the basis of an output detection voltage corresponding to the output and an inductor current flowing through the inductor, calculate conduction-period information regarding a conduction period in which the inductor current flows in one switching cycle of the power switch, and compensate the calculated duty on the basis of the conduction-period information.

The power factor correction controller may generate an output error voltage on the basis of the difference between the output detection voltage and a predetermined output reference voltage, calculate line-current information according to an average inductor current by low-pass filtering a sensing voltage corresponding to the inductor current, and calculate the duty on the basis of the output error voltage and the line-current information.

The power factor correction controller may calculate the duty by dividing the line-current information by the output error voltage and subtracting a voltage corresponding to a result of dividing the line-current information by the output error voltage from a predetermined reference duty voltage.

The power factor correction controller may detect a zero-cross time of the inductor current, and calculate the conduction-period information on the basis of a period from a point of time when the power switch is turned on to the detected zero-cross time.

The power factor correction controller may calculate the conduction-period information by sampling a reference signal synchronized with a switching frequency of the power switch at the detected zero-cross time, holding the sampled reference signal to generate a conduction detection voltage, and converting the conduction period into voltage information on the basis of the conduction detection voltage.

The reference signal may include a sawtooth wave decreasing with a predetermined slope in one switching cycle of the power switch. The power factor correction controller may determine a voltage of the conduction-period information on the basis of a voltage obtained by subtracting the conduction detection voltage from a predetermined reference voltage.

The power factor correction circuit may further include an auxiliary wire coupled to the inductor. The power factor correction controller may detect the zero-cross time using voltages of opposite ends of the auxiliary wire.

The power factor correction controller may generate a duty control signal by multiplying the calculated duty by the conduction-period information.

The power factor correction controller may turn off the power switch according to a result of comparing the duty control signal with a predetermined reference signal synchronized with a switching frequency of the power switch.

The power factor correction controller may generate a clock signal for determining the switching frequency of the power switch, and turn off the power switch in synchronization with the clock signal.

According to another aspect of the present invention, a method of driving a power factor correction circuit including an inductor to which an input voltage is applied and a power switch connected to the inductor includes generating an output error voltage corresponding to an output of the power factor correction circuit; generating line-current information on the basis of an inductor current flowing through the inductor; calculating conduction-period information regarding a conduction period in which the inductor current flows in one switching cycle of the power switch; calculating a duty according to the output error voltage and the line-current information; and compensating the calculated duty according to the conduction-period information.

The generating of the output error voltage may include generating an output detection voltage following the output of the power factor correction circuit; and amplifying the difference between the output detection voltage and a predetermined output reference voltage.

The generating of the line-current information may include low-pass filtering a sensing voltage corresponding to the inductor current.

The calculating of the conduction-period information may include detecting a zero-cross time of the inductor current; and calculating the conduction-period information on the basis of a period from a point of time when the power switch is turned on to the zero-cross time.

The calculating of the conduction-period information may include sampling a reference signal synchronized with a switching frequency of the power switch at the zero-cross time; generating a conduction detection voltage by holding the sampled reference signal; and determining a voltage of the conduction-period information on the basis of the conduction detection voltage.

The reference signal may include a sawtooth wave decreasing with a predetermined slope in one switching cycle of the power switch. The determining of the voltage of the conduction-period information may include determining the voltage of the conduction-period information on the basis of a voltage obtained by subtracting the conduction detection voltage from a predetermined reference voltage.

The calculating of the duty may include dividing the conduction-period information by the output error voltage; and calculating the duty by subtracting a voltage corresponding to a result of dividing the conduction-period information by the output error voltage from a predetermined reference duty voltage.

The correcting of the duty may include multiplying the calculated duty by the conduction-period information.

DETAILED DESCRIPTION OF THE EMBODIMENTS

Figure 1:
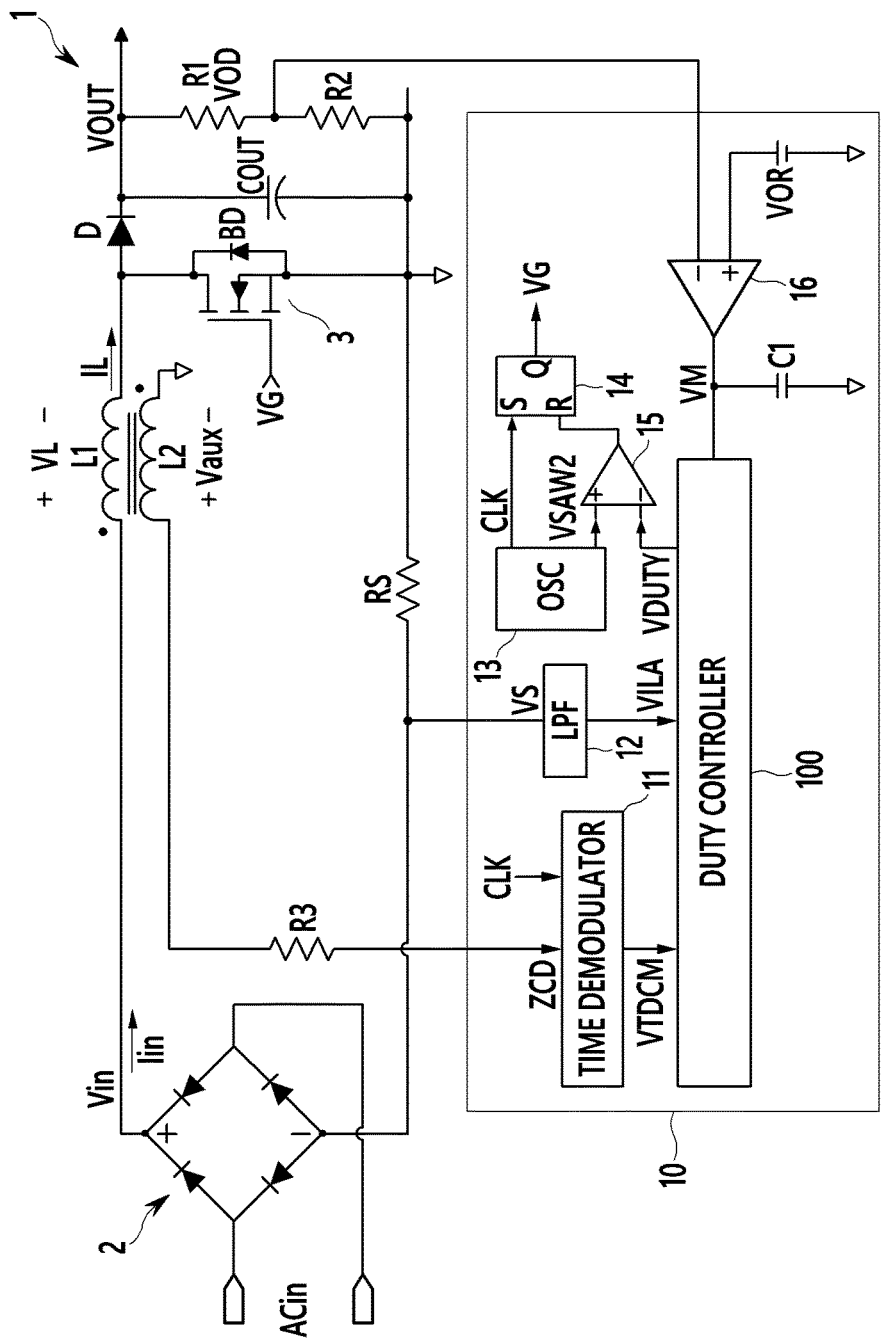
FIG. 1 is a diagram illustrating a power factor correction circuit according to an embodiment.

Hereinafter, embodiments of the present invention will be described in detail with reference to the accompanying drawings so that those of ordinary skill in the art can easily practice the invention. However, the present invention may be embodied in many different forms and is not limited to embodiments set forth herein. Exemplary embodiments of the present invention will now be described more fully with reference to the accompanying drawings. In the drawings, matters that are not related to describing embodiments are omitted for clarity, and like reference numerals are assigned to like elements throughout the specification.

In the present disclosure, it will be understood that when an element or layer is referred to as being 'connected to' another element or layer, the element or layer can be directly connected to another element or layer or can be 'electrically connected to' another element or layer via an intervening element or layer. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

FIG. 1 is a diagram illustrating a power factor correction circuit according to an embodiment.

A power factor correction circuit 1 includes a rectification circuit 2, an inductor L1, a power switch 3, a capacitor COUT, a sensing resistor RS, an auxiliary wire L2, a diode D, division resistors R1 and R2, and a power factor correction controller 10. In the power switch 3, body diodes BD are formed in parallel.

The rectification circuit 2 may be embodied as a bridge diode including four diodes. The rectification circuit 2 full-wave rectifies an alternating-current (AC) input ACin. The AC input ACin is supplied as an input voltage Vin to the power factor correction circuit 1 through the rectification circuit 2. An input current Tin of the power factor correction circuit 1 is an average inductor current IL and is a line current.

The inductor L1 is a power transfer device. An input voltage Vin is applied to one end of the inductor L1, and another end of the inductor L1 is connected to the power switch 3 and an anode electrode of the diode D. A voltage VL between opposite ends of the inductor L1 is equal to the input voltage Vin while the power switch 3 is on, and a negative voltage (VOUT−Vin) which is a result of subtracting the input voltage Vin from an output voltage VOUT while the power switch 3 is off.

The inductor L1 receives the input voltage Vin and generates output power. An inductor current IL flowing through the inductor L1 is controlled through a switching operation of the power switch 3. The inductor current IL repeatedly increases and decreases according to the switching operation. The inductor current IL increases while the power switch 3 is turned on, and decreases while the power switch 3 is turned off. In detail, while the power switch 3 is turned on, the inductor current IL increases and the inductor L1 stores energy. While the power switch 3 is turned off, the inductor current IL flows through the diode D and energy stored in the inductor L1 is transferred to an output terminal of the power factor correction circuit 1. When the power switch 3 is turned off and the diode D is conductive, the inductor current IL may flow to the output terminal of the power factor correction circuit 1 and charge the capacitor COUT.

The auxiliary wire L2 is coupled to the inductor L1 at a predetermined turn ratio. When a turn ratio of the inductor L1 is N and a turn ratio of the auxiliary wire L2 is 1, the predetermined turn ratio is 1/N. The voltage VL between opposite ends of the inductor L1 is converted into an auxiliary voltage Vaux between opposite ends of the auxiliary wire L2 according to the turn ratio. The auxiliary voltage Vaux is used to detect a zero-current duration of the inductor L1.

One end of the auxiliary wire L2 is connected to the ground and another end thereof is connected to a resistor R3. An auxiliary voltage Vaux is connected to the power factor correction controller 10 via the resistor R3. A zero-current detection voltage ZCD is applied to the power factor correction controller 10. The zero-current detection voltage ZCD follows the auxiliary voltages Vaux.

While the power switch 3 is on, the auxiliary voltage Vaux is a negative voltage which is the product of the input voltage Vin and the turn ratio. While the power switch 3 is off, the auxiliary voltage Vaux is a positive voltage which is the product of the voltage (VOUT-Vin) which is a result of subtracting the input voltage Vin from the output voltage VOUT and the turn ratio.

The power switch 3 includes an n-channel metal oxide semiconductor field effect transistor (NMOSFET), and is turned on or off by a gate voltage VG of the power factor correction controller 10. A drain electrode of the power switch 3 is connected to the anode electrode of the diode D and the other end of the inductor L1, and a source electrode thereof is connected to the ground.

One end of the sensing resistor RS is connected to the ground, and another end of the sensing resistor RS is connected to one end (a negative (−) terminal) of the rectification circuit 2. While the power switch 3 is on, current flows from the end of the sensing resistor RS to the other end thereof. Thus, a sensing voltage VS is a negative voltage. The sensing voltage VS has polarity opposite to that of the inductor current IL but has the same waveform as the inductor current IL. For example, as the inductor current IL increases, the sensing voltage VS increases in a direction of a negative voltage.

A cathode electrode of the diode D is connected to one end of the capacitor COUT. When the power switch 3 is turned off, current flowing through the inductor L1 flows through the diode D. The capacitor COUT is charged with the inductor current IL while the diode D is conductive. The output voltage VOUT is the same as a voltage of the capacitor COUT.

The division resistors R1 and R2 generate an output detection voltage VOD by dividing the output voltage VOUT.

The power factor correction controller 10 may generate information regarding an average inductor current IL (hereinafter referred to as 'line-current information' VILA) using the sensing voltage VS, generate an output error voltage VM using the output detection voltage VOD, and calculate a duty from the line-current information VILA and the output error voltage VM.

The power factor correction controller 10 may generate information regarding a conduction period in which the inductor current IL flows (hereinafter referred to as 'conduction-period information') using the zero-current detection voltage ZCD, and compensate a duty calculated on the basis of the conduction-period information.

As illustrated in FIG. 1, the power factor correction controller 10 includes a time demodulator 11, a low-pass filter (LPF) 12, an oscillator (OSC) 13, an SR flip-flop 14, a comparator 15, an error amplifier 16, a compensation capacitor C1, and a duty controller 100.

The time demodulator 11 may generate a conduction detection voltage VTDCM in synchronization with a zero-cross time according to the zero-current detection voltage ZCD. For example, the time demodulator 11 may generate the conduction detection voltage VTDCM by sampling and holding a voltage of a sawtooth wave VSAW1 at the zero-cross time.

Figure 2:
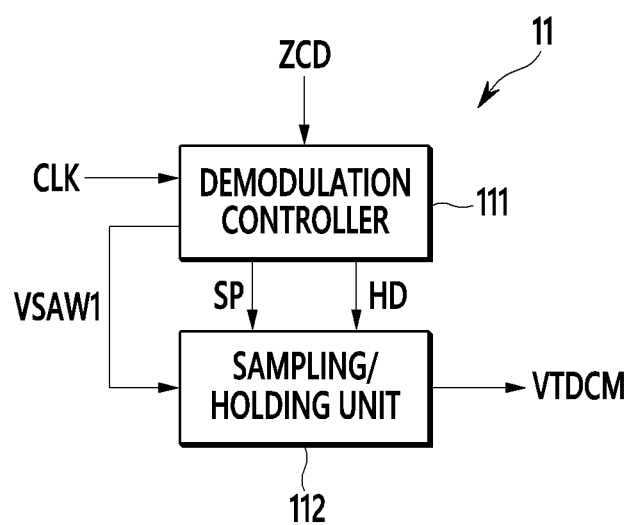
FIG. 2 is a diagram illustrating a time demodulator according to an embodiment.

FIG. 2 is a diagram illustrating a time demodulator according to an embodiment.

As illustrated in FIG. 2, a time demodulator 11 includes a demodulation controller 111 and a sampling/holding unit 112.

The demodulation controller 111 may generate a sawtooth wave VSAW1, a sampling signal SP, and a holding signal HD according to a clock signal CLK and a zero-current detection voltage ZCD.

For example, the demodulation controller 111 may generate the sawtooth wave VSAW1 synchronized with the clock signal CLK and having the same frequency as the clock signal CLK. In detail, the sawtooth wave VSAW1 may be a signal which is synchronized with a switching frequency of the power switch 3 and which increases or decreases with a predetermined slope in one switching cycle. In the following description, the sawtooth wave VSAW1 increases to a predetermined voltage in synchronization with a rising edge of the clock signal CLK and then decreases with the predetermined slope in one switching cycle. However, the present invention is not limited thereto and the sawtooth wave VSAW1 may increase in one switching cycle.

The demodulation controller 111 may enable the sampling signal SP and disable the holding signal HD in synchronization with the clock signal CLK. In detail, in the embodiment of FIG. 1, since the power switch 3 is turned on in synchronization with a rising edge of the clock signal CLK, the demodulation controller 111 may enable the sampling signal SP at the rising edge of the clock signal CLK.

The demodulation controller 111 may disable the sampling signal SP and enable the holding signal HD in synchronization with a point of time when the zero-current detection voltage ZCD indicates a zero current. The inductor current IL starts to decrease from a point of time when the power switch 3 is turned off and becomes equal to a zero current. When the inductor current IL becomes equal to a zero current, the zero-current detection voltage ZCD may be equal to a zero voltage. The demodulation controller 111 may compare the zero-current detection voltage ZCD with a threshold voltage, and disable the sampling signal SP and enable the holding signal HD when the zero-current detection voltage ZCD becomes equal to the threshold voltage.

The threshold voltage is a voltage for detecting a point of time when the zero-current detection voltage ZCD becomes equal to a zero voltage, and may be set to a voltage which is the sum of the zero voltage and a predetermined margin. Embodiments will be hereinafter described on the assumption that the threshold voltage is the zero voltage.

The sampling/holding unit 112 may sample the sawtooth wave VASW1 while the sampling signal SP is enabled, hold a voltage of the sawtooth wave VASW1 sampled at a point of time when the holding signal HD is enabled at the conduction detection voltage VTDCM, and maintain the voltage of the sawtooth wave VASW1 at the conduction detection voltage VTDCM before the sawtooth wave VASW1 is sampled in a subsequent switching cycle.

The LPF 12 calculates line-current information VILA by low-pass filtering the sensing voltage VS. The sensing voltage VS is a negative voltage having a value of −IL*RS, and is changed to the line-current information VILA through the LPF 12. Thus, the line-current information VILA is a negative voltage.

The OSC 13 may generate the clock signal CLK and a sawtooth wave VSAW2 which determine a switching frequency of the power switch 3. For example, the OSC 13 may generate the clock signal CLK with the switching frequency, and generate the sawtooth wave VSAW2 which increases with a predetermined slope in one cycle of the clock signal CLK, starting from a rising edge of the clock signal CLK. The sawtooth wave VSAW2 is an example of a reference signal synchronized with the switching frequency of the power switch 3, but a waveform of the sawtooth wave VSAW2 is not limited thereto.

However, the present invention is not limited thereto, and the OSC 13 may generate the sawtooth wave VSAW2 to decrease from a predetermined voltage to a zero voltage in a switching cycle. In this case, unlike the illustration of FIG. 1, the sawtooth wave VSAW2 is input to an inverting terminal (−) of the comparator 15 and the duty control signal VDUTY is input to a non-inverting terminal (+) of the comparator 15. Then the comparator 15 generates the off control signal OFFS to have a high level when a value of the sawtooth wave VDUTY is higher than or equal to that of the duty control signal VSAW2, and generates the off control signal OFFS to have a low level when the value of the sawtooth wave VDUTY is lower than that of the duty control signal VSAW2.

The SR flip-flop 14 generates a gate voltage VG to have an on level according to an input of a set terminal S, and generates the gate voltage VG to have an off level according to an input of a reset terminal R.

The clock signal CLK is input to the set terminal S and the off control signal OFFS is input to the reset terminal R. Then the SR flip-flop 14 increases the gate voltage VG to the on level in synchronization with a rising edge of the clock signal CLK, and decreases the gate voltage VG to the off level in synchronization with a rising edge of the off control signal OFFS.

The error amplifier 16 amplifies and outputs the difference between the output detection voltage VOD and an output reference voltage VOR. An output of the error amplifier 16 is compensated by the compensation capacitor C1 to generate an output error voltage VM. The output detection voltage VOD is input to an inverting terminal (−) of the error amplifier 16, and the output reference voltage VOR is input to a non-inverting terminal (+) of the error amplifier 16.

The duty controller 100 may generate the duty control signal VDUTY by calculating a duty on the basis of the line-current information VILA and the output error voltage VM and compensating the calculated duty on the basis of the conduction-period information.

Figure 3:
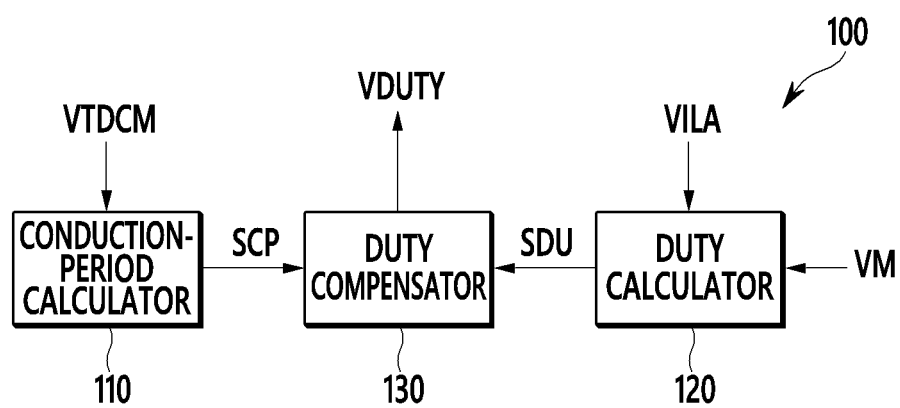
FIG. 3 is a diagram illustrating a duty controller according to an embodiment.

FIG. 3 is a diagram illustrating a duty controller according to an embodiment.

As illustrated in FIG. 3, a duty controller 100 includes a conduction-period calculator 110, a duty calculator 120, and a duty compensator 130.

The conduction-period calculator 110 receives a conduction detection voltage VTDCM, and generates conduction-period information SCP by subtracting the conduction detection voltage VTDCM from a predetermined reference voltage CR. The predetermined reference voltage CR may be set such that a ratio between the predetermined reference voltage CR and the conduction detection voltage VTDCM may follow a ratio between one switching cycle and a zero-current duration.

When the power factor correction circuit 1 operates in the CCM, an inductor current IL is continuously generated and thus the conduction detection voltage VTDCM may be a zero voltage. In this case, the conduction-period information SCP may have a maximum voltage. When the power factor correction circuit 1 operates in the DCM, the conduction-period information SCP is equal to a voltage obtained by subtracting the conduction detection voltage VTDCM from the predetermined reference voltage CR. Thus, as the zero-current duration increases, the voltage of the conduction-period information SCP may decrease.

In one embodiment, it will be described that the conduction detection voltage VTDCM increases as the zero-current duration increases. This is because a sawtooth wave VSAW1 has a waveform which decreases in one switching cycle. However, the present invention is not limited thereto, and a voltage of the conduction-period information SCP may increase according to a conduction period in various modified embodiments.

For example, if the sawtooth wave VSAW1 has a waveform increasing in one switching cycle, when the sawtooth wave VSAW1 is sampled in synchronization with a falling edge of a sampling signal SP, a sampled voltage may increase as the conduction period increases. That is, the time demodulator 11 may generate a conduction detection voltage VTDCM corresponding to the conduction-period information SCP. In this case, the power factor correction circuit 1 may not include the conduction-period calculator 110.

The duty calculator 120 may calculate duty information SDU by dividing line-current information VILA by an output error voltage VM and subtracting, from a predetermined reference duty voltage DR, a voltage corresponding to a result VILA/VM of dividing the value of the line-current information VILA by the output error voltage VM.

In this case, the line-current information VILA is a negative voltage as described above and thus the result VILA/VM may be a negative voltage. Then the duty calculator 120 may calculate the duty information SDU by adding the result VILA/VM to the predetermined reference duty voltage DR, as indicated in Equation 1 below.

$$SDU = DR + VILA/VM \qquad \text{[Equation 1]}$$

In Equation 1, SDU represents a value of the duty information SDU, VILA represents a negative value of the line-current information VILA, and VM represents the output error voltage VM.

The duty compensator 130 may generate a duty control signal VDUTY by multiplying the duty information SDU and the conduction-period information SCP together. In the CCM, the conduction-period information SCP is fixed to a maximum voltage and thus the duty control signal VDUTY is determined according to the duty information SDU. In the DCM, a voltage of the conduction-period information SCP varies according to a conduction period and thus the duty control signal VDUTY may be determined according to the conduction period as well as the duty information SDU, as indicated in Equation 2 below.

$$VDUTY = (DR + VILA/VM)*(CR - VTDCM) \qquad \text{[Equation 2]}$$

In Equation 2, CR represents a value of the predetermined reference voltage CR and VTDCM represents a value of the conduction detection voltage VTDCM.

Figure 4A:
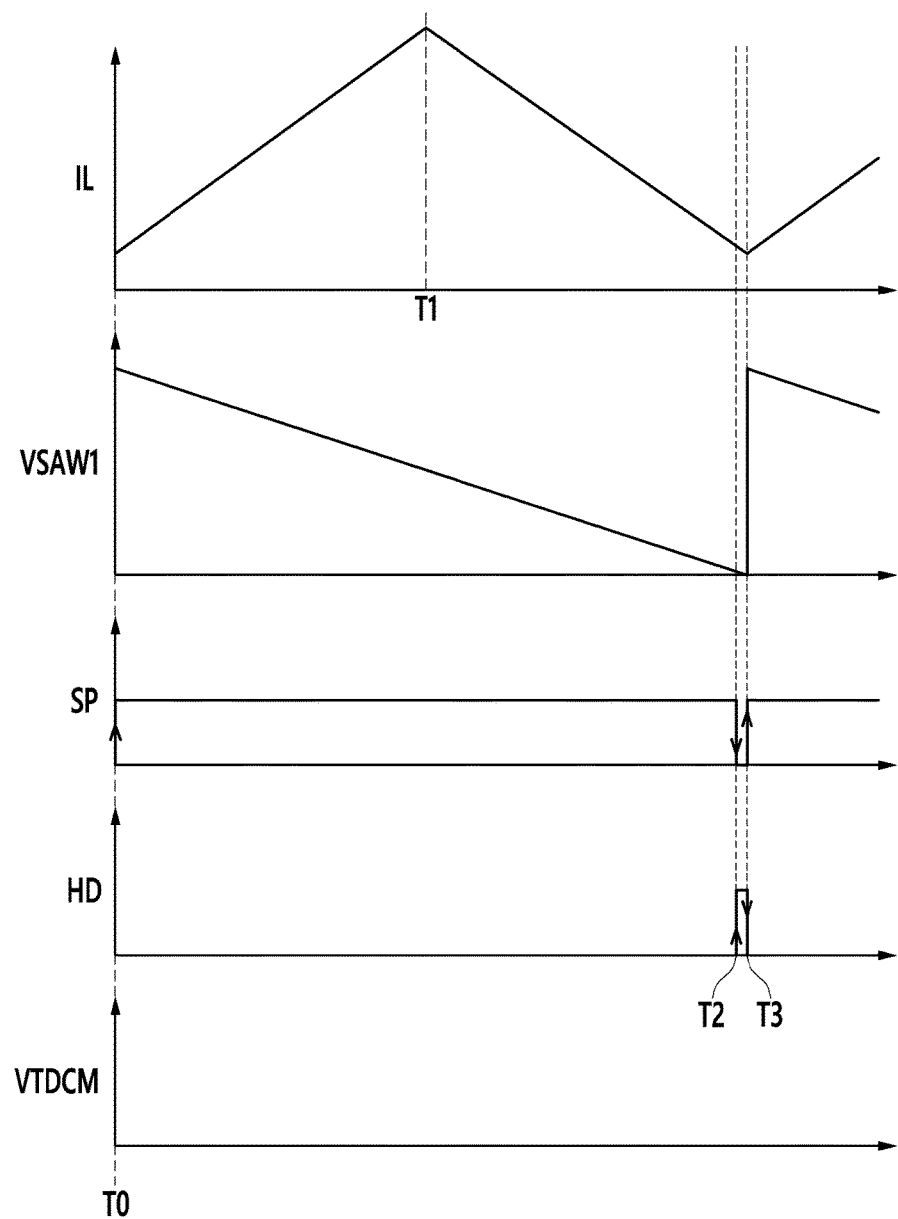
FIG. 4A is a diagram illustrating waveforms of a sensing voltage, a sawtooth wave, a sampling signal, and a holding signal in a continuous conduction mode (CCM)

FIG. 4A is a diagram illustrating waveforms of a sensing voltage, a sawtooth wave, a sampling signal, and a holding signal in the CCM.

As illustrated in FIG. 4A, at a point of time T0, the power switch 3 is turned on in synchronization with a rising edge of a clock signal CLK and an inductor current IL starts to increase. At the point of time T0, a sampling signal SP increases to a high level triggered by a clock signal CLK. A sawtooth wave VSAW1 starts to decrease from the point of time T0.

As a sawtooth wave VSAW2 reaches a level of a duty control signal VDUTY, the power switch 3 is turned off at a point of time T1. From the point of time T1, the inductor current IL starts to decrease.

At a point of time T2, a zero-current detection voltage ZCD decreases to a threshold voltage. In synchronization with the point of time T2, the sampling signal SP decreases to a low level and a holding signal HD increases to a high level. At the point of time T2, the sawtooth wave VSAW1 is sampled and a conduction detection voltage VTDCM is held at a zero voltage.

At a point of time T3, the power switch 3 is turned on in synchronization with a rising edge of a clock signal CLK, and the inductor current IL starts to increase. A duty control signal VDUTY in a subsequent switching cycle (a switching cycle starting from the point of time T3) is generated according to the conduction detection voltage VTDCM held at the point of time T2.

As illustrated in FIG. 4A, in the CCM, the conduction detection voltage VTDCM is sampled at a zero voltage and thus conduction-period information SCP may have a maximum voltage. Although FIG. 4A illustrates the point of time T2 and the point of time T3 when the power switch 3 is turned on to be differentiated from each other for convenience of explanation, the present invention is not limited thereto and the point of time T2 and the point of time T3 may be substantially the same.

Figure 4B:
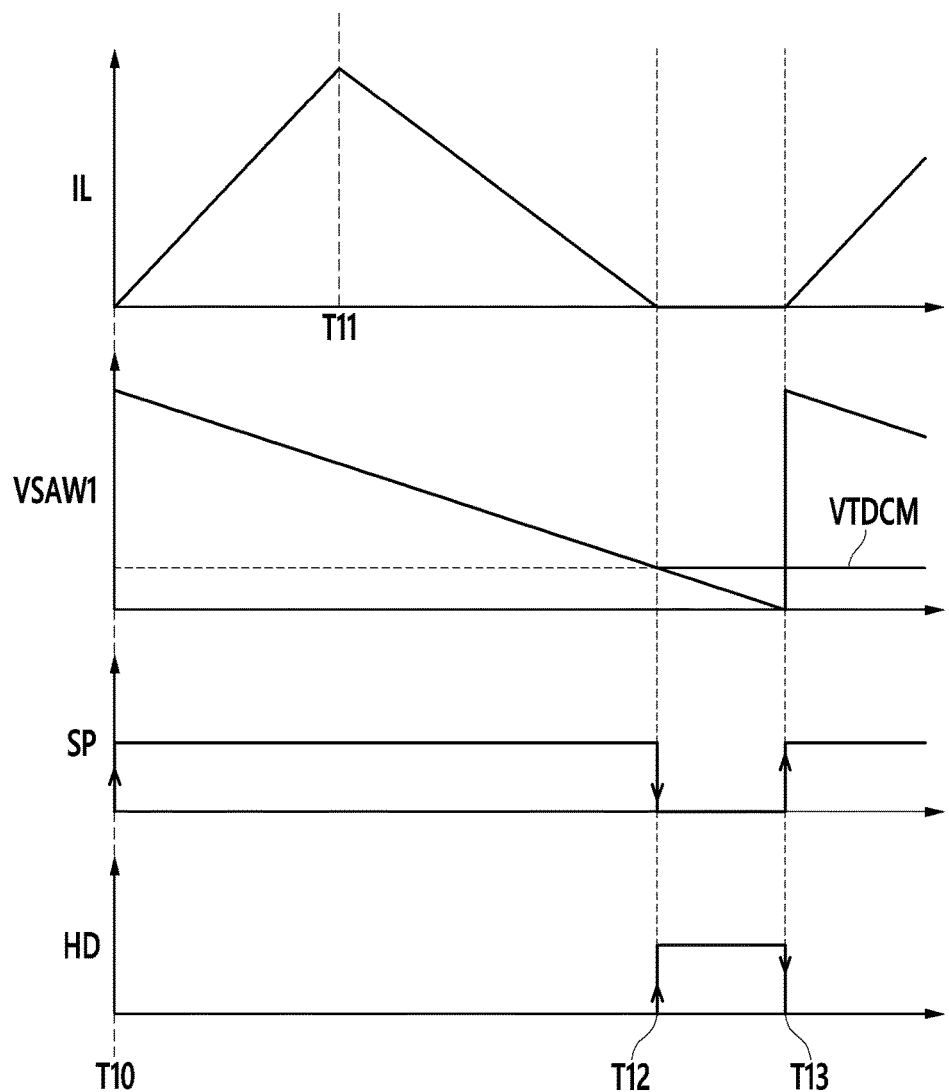
FIG. 4B is a diagram illustrating waveforms of a sensing voltage, a sawtooth wave, a sampling signal, and a holding signal in a discrete conduction mode (DCM)

FIG. 4B is a diagram illustrating waveforms of a sensing voltage, a sawtooth wave, a sampling signal, and a holding signal in the DCM.

As illustrated in FIG. 4B, at a point of time T10, the power switch 3 is turned on in synchronization with a rising edge of a clock signal CLK and an inductor current IL starts to increase. At the point of time T10, a sampling signal SP increases to a high level triggered by the clock signal CLK. A sawtooth wave VSAW1 starts to decrease, starting from the point of time T10.

As a sawtooth wave VSAW2 reaches a level of a duty control signal VDUTY, the power switch 3 is turned off at a point of time T11. The inductor current IL starts to decrease from the point of time T11, and reaches a zero current at a point of time T12.

At the point of time T12, the sampling signal SP decreases to a low level in synchronization with a zero-current detection voltage ZCD and a holding signal HD increases to a high level. At the point of time T12, the sawtooth wave VSAW1 is sampled and a conduction detection voltage VTDCM is held at a voltage of the sawtooth wave VASW1 sampled at the point of time T12.

At a point of time T13, the power switch 3 is turned on in synchronization with a rising edge of the clock signal CLK and the inductor current IL starts to increase. According to the conduction detection voltage VTDCM held in a period T12-T13, a duty control signal VDUTY in a subsequent switching cycle (a switching cycle from the point of time T13) is generated.

As illustrated in FIG. 4B, in the DCM, a voltage of conduction-period information SCP decreases by the conduction detection voltage VTDCM and thus a level of the duty control signal VDUTY decreases.

As an input voltage Vin increases or a load decreases, the CCM may be switched to the DCM. In one embodiment, in the DCM, the level of the duty control signal VDUTY may be decreased to prevent distortion of a line current.

Figure 5A:
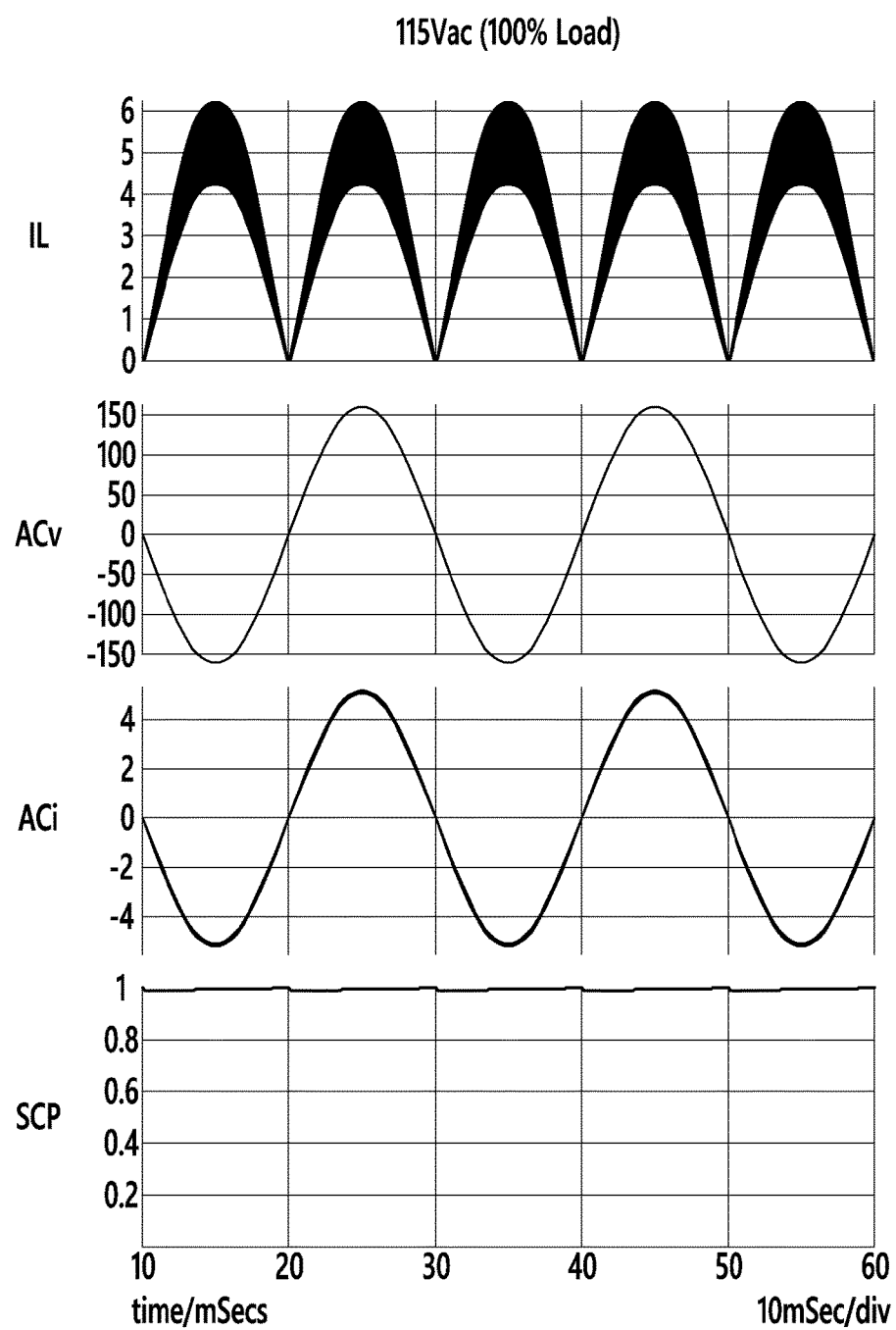
FIG. 5A is a diagram illustrating waveforms of signals in a power factor correction circuit operating in the CCM according to an embodiment.

FIG. 5A is a diagram illustrating waveforms of signals in a power factor correction circuit operating in the CCM according to an embodiment.

FIG. 5A illustrates waveforms of an inductor current IL, a voltage ACv and a current ACi of an AC input ACin, and a voltage of conduction-period information SCP. Rectification waveforms of the voltage ACv and the current ACi of the AC input ACin illustrated in FIGS. 5A, 5B, and 5C may be substantially the same as waveforms of an input voltage Vin and an input current Iin. In detail, the waveforms illustrated in FIG. 5A are those obtained when the AC input ACin is 115 Vac under a 100% load condition.

As illustrated in FIG. 5A, in the CCM, the voltage of the conduction-period information SCP is maintained at a maximum level (1 in FIG. 5A).

Figure 5B:
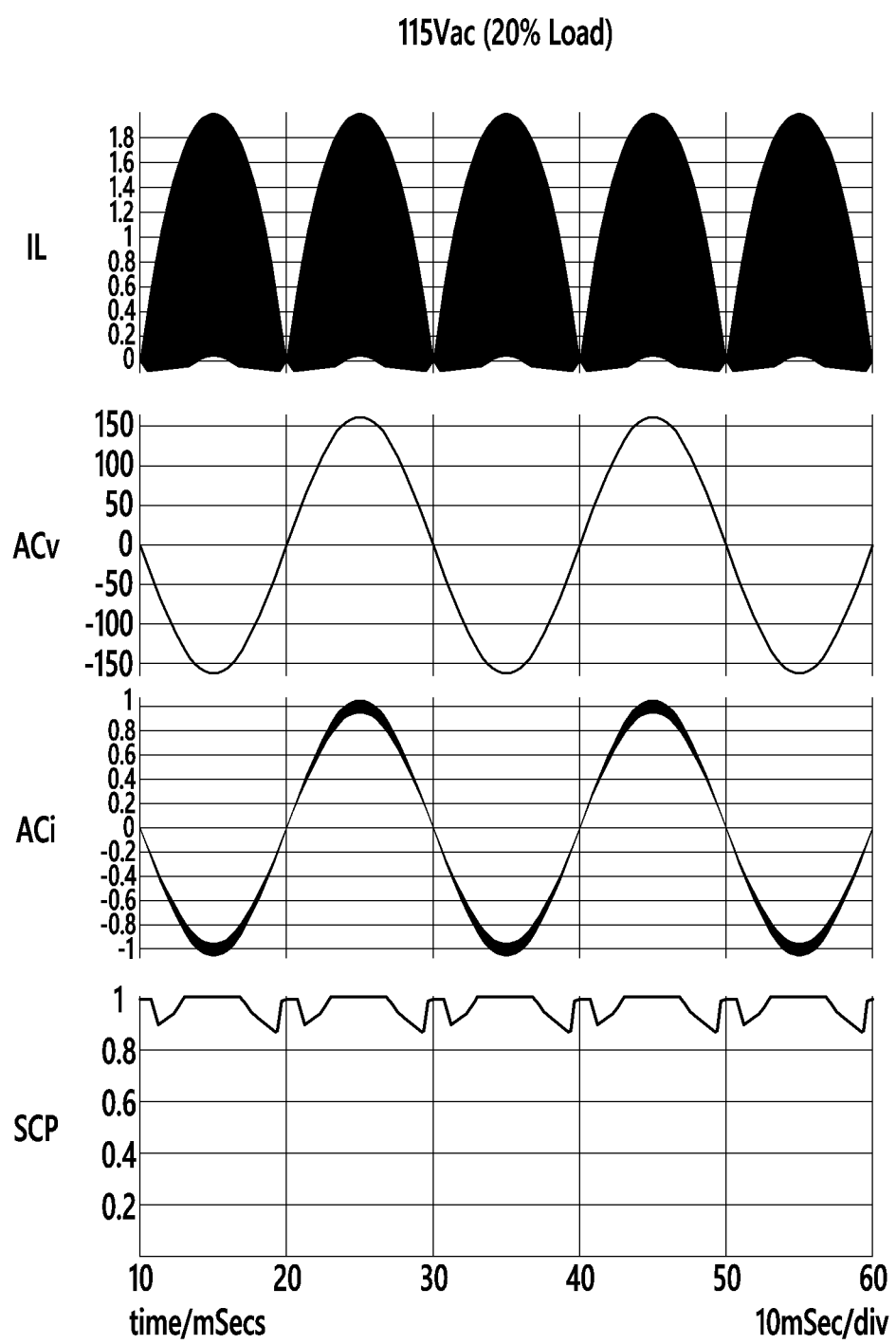
FIG. 5B is a diagram illustrating waveforms of signals in a power factor correction circuit operating in the CCM and the DCM according to an embodiment.

FIG. 5B is a diagram illustrating waveforms of signals in a power factor correction circuit operating in the CCM and the DCM according to an embodiment.

FIG. 5B illustrates waveforms of an inductor current IL, a voltage ACv and a current ACi of an AC input ACin, and a voltage of conduction-period information SCP when a power factor correction circuit 1 operates in either the CCM or the DCM in one cycle of an input voltage Vin. In detail, the waveforms illustrated in FIG. 5B are those obtained when the AC input ACin is 115 Vac under a 20% load condition.

As illustrated in FIG. 5B, the voltage of the conduction-period information SCP is 1 in the CCM but decreases in the DCM.

Figure 5C:
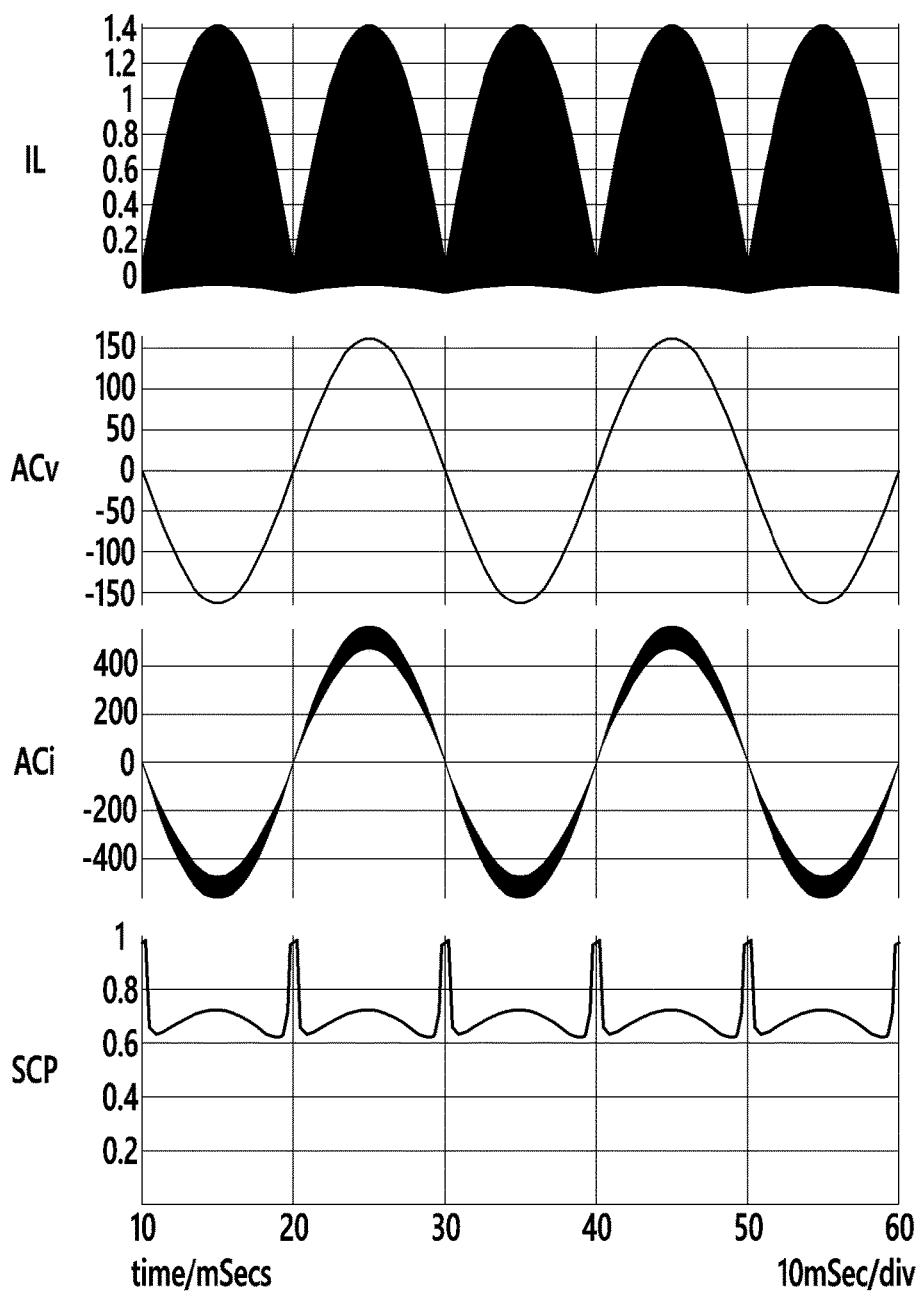
FIG. 5C is a diagram illustrating waveforms of signals in a power factor correction circuit operating in the DCM according to an embodiment.

FIG. 5C is a diagram illustrating waveforms of signals in a power factor correction circuit operating in the DCM according to an embodiment.

FIG. 5C illustrates waveforms of an inductor current IL, a voltage ACv and a current ACi of an AC input ACin, and a voltage of conduction-period information SCP, under a condition that the power factor correction circuit 1 operates in the DCM. In detail, the waveforms illustrated in FIG. 5C are those obtained when the AC input ACin is 115 Vac under a 10% load condition.

As illustrated in FIG. 5C, in the DCM, the conduction-period information SCP has a voltage of 1 in a very short time period, and has a voltage less than 1 while the inductor current IL does not flow.

As illustrated in FIGS. 5A to 5C, a waveform of an input current Iin is not distorted and follows that of the input voltage Vin regardless of a load condition.

A case in which the voltage ACv of the AC input ACin increases will be described with reference to FIGS. 6A to 6C below. As in FIGS. 5A to 5C, rectification waveforms of a voltage ACv and a current ACi of an AC input ACin illustrated in FIGS. 6A, 6B, and 6C may be the same as waveforms of an input voltage Vin and an input current Iin.

Figure 6A:
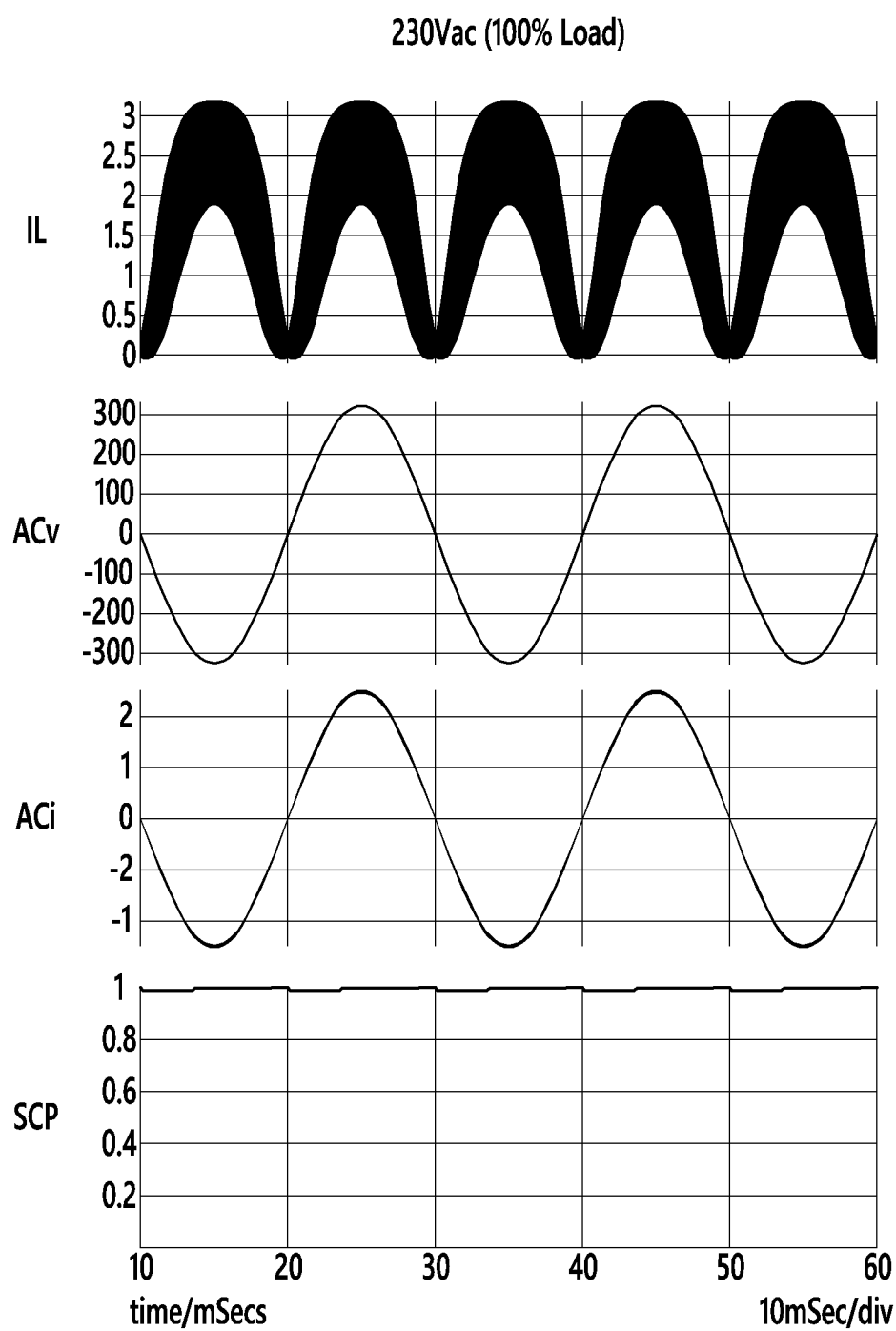
FIG. 6A is a diagram illustrating waveforms of signals in a power factor correction circuit operating in the CCM according to another embodiment.

FIG. 6A is a diagram illustrating waveforms of signals in a power factor correction circuit operating in the CCM according to another embodiment.

FIG. 6A illustrates waveforms of an inductor current IL, a voltage ACv and a current ACi of an AC input ACin, and a voltage of conduction-period information SCP. In detail, the waveforms illustrated in FIG. 6A are those obtained when the AC input ACin is 230 Vac under a 100% load condition.

As illustrated in FIG. 6A, the voltage of conduction-period information SCP in the CCM is maintained at a maximum level (1 in FIG. 6A).

Figure 6B:
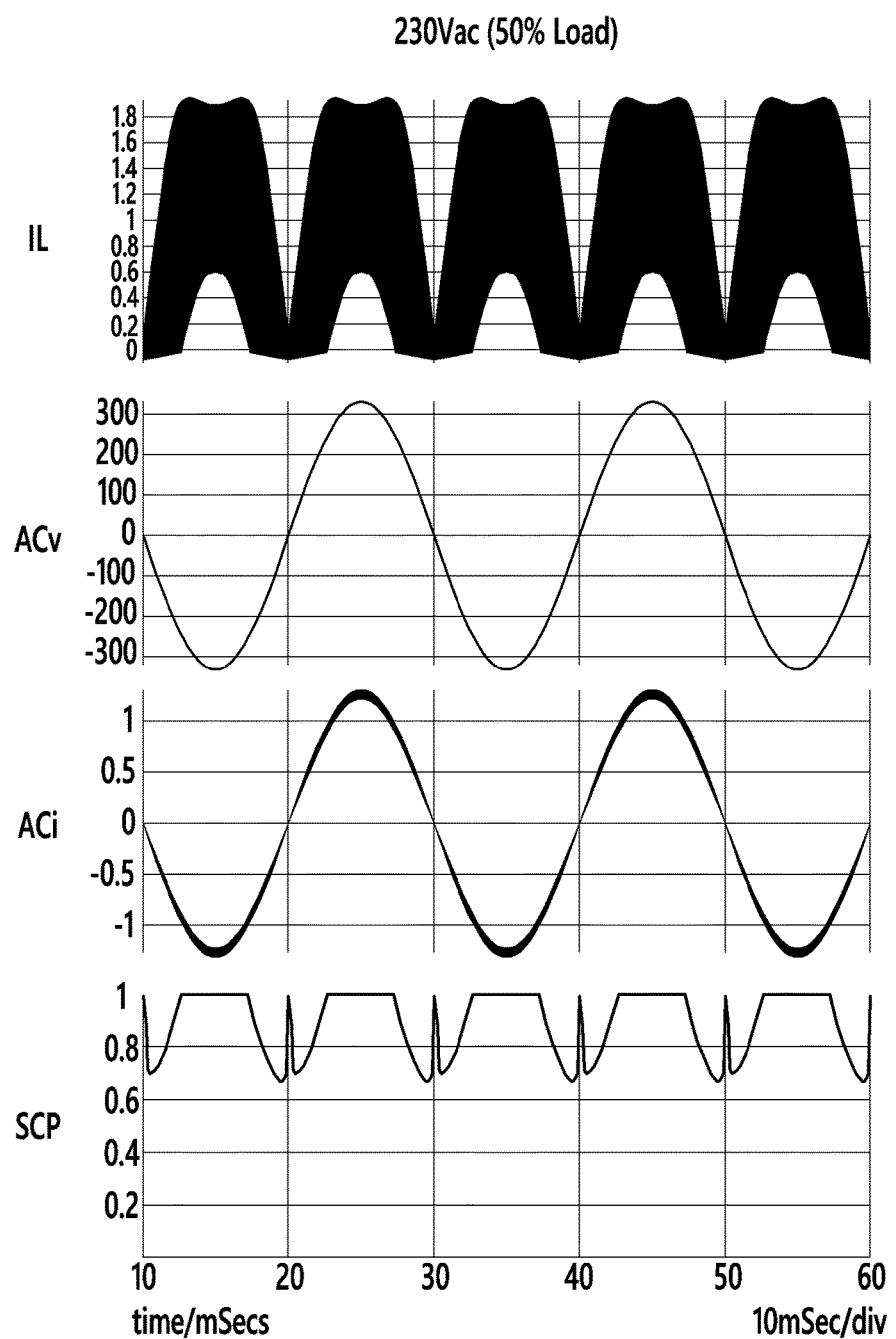
FIG. 6B is a diagram illustrating waveforms of signals in a power factor correction circuit operating in the CCM and the DCM according to another embodiment.

FIG. 6B is a diagram illustrating waveforms of signals in a power factor correction circuit operating in the CCM and the DCM according to another embodiment.

FIG. 6B illustrates waveforms of an inductor current IL, a voltage ACv and a current ACi of an AC input ACin, and a voltage of conduction-period information SCP when the power factor correction circuit 1 operates in either the CCM or the DCM in one cycle of an input voltage Vin. In detail, the waveforms illustrated in FIG. 6B are those obtained when the AC input ACin is 230 Vac under a 50% load condition.

As illustrated in FIG. 6B, the voltage of the conduction-period information SCP is 1 in the CCM but decreases in the DCM.

Figure 6C:
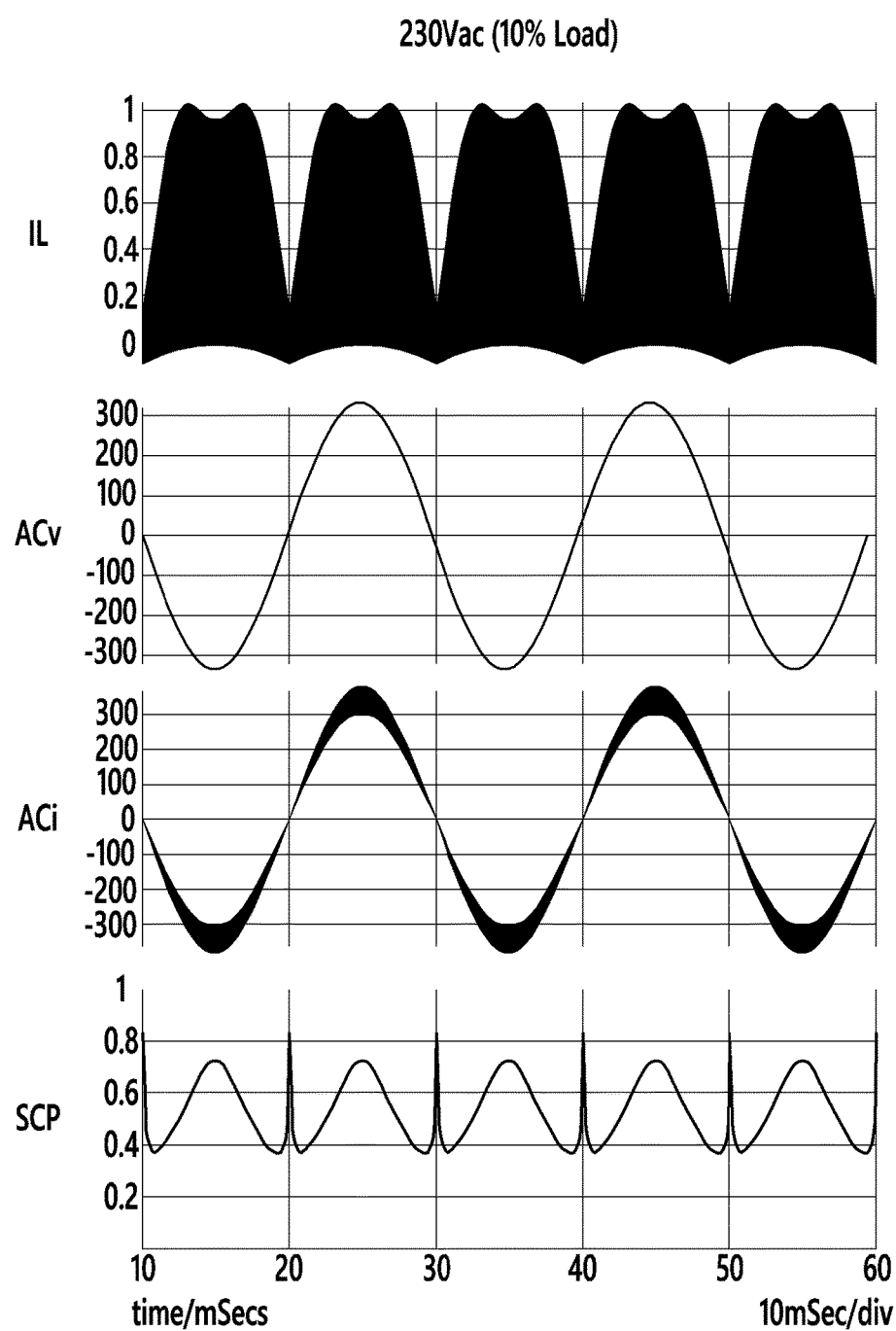
FIG. 6C is a diagram illustrating waveforms of signals in a power factor correction circuit operating in the DCM according to another embodiment.

FIG. 6C is a diagram illustrating waveforms of signals in a power factor correction circuit operating in the DCM according to another embodiment.

FIG. 6C illustrates waveforms of an inductor current IL, a voltage ACv and a current ACi of an AC input ACin, and a voltage of conduction-period information SCP, under a condition that the power factor correction circuit 1 operates in the DCM. In detail, the waveforms illustrated in FIG. 6C are those obtained when the AC input ACin is 230 Vac under a 10% load condition.

As illustrated in FIG. 6C, in the DCM, the conduction-period information SCP has a voltage of 1 in a very short time period and has a value less than 1 in a period in which the inductor current IL does not flow.

As illustrated in FIGS. 6A to 6C, a waveform of an input current Iin is not distorted and follows that of the input voltage Vin regardless of a load condition.

Furthermore, referring to FIGS. 5A to 5C and 6A to 6C, the waveform of the input current Iin is not distorted and follows that of the input voltage Vin regardless of a voltage of the AC input ACin.

As described above, distortion of an input current may be suppressed regardless of an input voltage, a load, etc., thereby improving a power factor and total harmonic distortion (THD).

While a plurality of embodiments have been described above in detail, the scope of the present invention is not limited thereto, and it should be understood that various modifications and improvements made by those of ordinary skill in the art on the basis of the basic concept of the present invention defined in the appended claims fall within the scope of the invention.

What is claimed is:

1. A power factor correction circuit comprising:
   an inductor having a first end to which an input voltage is applied;
   a power switch connected between a second end of the inductor and a ground, the power switch being configured to control an output of the power factor correction circuit; and
   a power factor correction controller configured to calculate a duty of the power switch on the basis of an output detection voltage corresponding to the output of the power factor correction circuit and an inductor current flowing through the inductor, calculate conduction-period information regarding a conduction period in which the inductor current flows in one switching cycle of the power switch, and compensate the calculated duty of the power switch on the basis of the conduction-period information,
   wherein the power factor correction controller detects a zero-cross time of the inductor current and calculates the conduction-period information by sampling a reference signal synchronized with a switching frequency of the power switch at the detected zero-cross time, holding the sampled reference signal to generate a conduction detection voltage, and converting the conduction period into voltage information on the basis of the conduction detection voltage.

2. The power factor correction circuit of claim 1, wherein the power factor correction controller generates an output error voltage on the basis of a difference between the output detection voltage and a predetermined output reference voltage, calculates line-current information according to an average inductor current by low-pass filtering a sensing voltage corresponding to the inductor current, and calculates the duty of the power switch on the basis of the output error voltage and the line-current information.

3. The power factor correction circuit of claim 1, wherein the reference signal comprises a sawtooth wave that is decreasing with a predetermined slope in one switching cycle of the power switch, and
   the power factor correction controller determines a voltage of the conduction-period information on the basis of a voltage obtained by subtracting the conduction detection voltage from a predetermined reference voltage.

4. The power factor correction circuit of claim 1, further comprising an auxiliary wire coupled to the inductor, wherein the power factor correction controller detects the zero-cross time using voltages of opposite ends of the auxiliary wire.

5. The power factor correction circuit of claim 1, wherein the power factor correction controller generates a duty control signal by multiplying the calculated duty of the power switch by the conduction-period information.

6. The power factor correction circuit of claim 2, wherein the power factor correction controller calculates the duty of the power switch by dividing the line-current information by the output error voltage and subtracting a voltage corresponding to a result of dividing the line-current information by the output error voltage from a predetermined reference duty voltage.

7. The power factor correction circuit of claim 5, wherein the power factor correction controller turns off the power switch according to a result of comparing the duty control signal with a predetermined reference signal synchronized with the switching frequency of the power switch.

8. The power factor correction circuit of claim 7, wherein the power factor correction controller generates a clock signal for determining the switching frequency of the power switch, and turns off the power switch in synchronization with the clock signal.

9. A method of driving a power factor correction circuit including an inductor to which an input voltage is applied and a power switch connected to the inductor, the method comprising:
   generating an output error voltage corresponding to an output of the power factor correction circuit;
   generating line-current information based on an inductor current flowing through the inductor;
   calculating conduction-period information regarding a conduction period in which the inductor current flows in one switching cycle of the power switch;
   calculating a duty of the power switch according to the output error voltage and the line-current information; and
   compensating the calculated duty of the power switch according to the conduction-period information,
   wherein the calculating of the conduction-period information comprises:
   detecting a zero-cross time of the inductor current;

sampling a reference signal synchronized with a switching frequency of the power switch at the zero-cross time;

generating a conduction detection voltage by holding the sampled reference signal; and determining a voltage of the conduction-period information on the basis of the conduction detection voltage.

10. The method of claim 9, wherein the generating of the output error voltage comprises:

generating an output detection voltage following the output of the power factor correction circuit; and amplifying a difference between the output detection voltage and a predetermined output reference voltage.

11. The method of claim 9, wherein the generating of the line-current information comprises low-pass filtering a sensing voltage corresponding to the inductor current.

12. The method of claim 9, wherein the reference signal comprises a sawtooth wave that is decreasing with a predetermined slope in one switching cycle of the power switch, and the determining of the voltage of the conduction-period information comprises determining the voltage of the conduction-period information based on a voltage obtained by subtracting the conduction detection voltage from a predetermined reference voltage.

13. The method of claim 9, wherein the calculating of the duty comprises:

dividing the line-current information by the output error voltage; and calculating the duty of the power switch by subtracting a voltage corresponding to a result of dividing the line-current information by the output error voltage from a predetermined reference duty voltage.

14. The method of claim 9, wherein the compensating of the calculated duty comprises multiplying the calculated duty by the conduction-period information.

15. A power factor correction circuit comprising:

an inductor having a first end to which an input voltage is applied;

a power switch connected between a second end of the inductor and a ground, the power switch being configured to control an output of the power factor correction circuit; and a power factor correction controller configured to calculate a duty of the power switch on the basis of an output detection voltage corresponding to the output of the power factor correction circuit and an inductor current flowing through the inductor, calculate conduction-period information regarding a conduction period in which the inductor current flows in one switching cycle of the power switch, and compensate the calculated duty of the power switch on the basis of the conduction-period information, wherein the power factor correction controller generates an output error voltage on the basis of a difference between the output detection voltage and a predetermined output reference voltage, calculates line-current information according to an average inductor current by low-pass filtering a sensing voltage corresponding to the inductor current, and calculates the duty of the power switch by dividing the line-current information by the output error voltage and subtracting a voltage corresponding to a result of dividing the line-current information by the output error voltage from a predetermined reference duty voltage.

* * * * *